(12) United States Patent
Koyama et al.

(10) Patent No.: US 12,719,902 B2
(45) Date of Patent: Aug. 25, 2026

(54) MONITORING DEVICE, MONITORING METHOD, AND MONITORING PROGRAM

(71) Applicant: NTT, Inc., Tokyo (JP)

(72) Inventors: Takuma Koyama, Tokyo (JP); Masashi Tanaka, Tokyo (JP)

(73) Assignee: NTT, Inc., Tokyo (JP)

( * ) Notice: Subject to any disclaimer, the term of this patent is extended or adjusted under 35 U.S.C. 154(b) by 0 days.

(21) Appl. No.: 18/712,236

(22) PCT Filed: Nov. 25, 2021

(86) PCT No.: PCT/JP2021/043242
§ 371 (c)(1),
(2) Date: May 21, 2024

(87) PCT Pub. No.: WO2023/095258
PCT Pub. Date: Jun. 1, 2023

(65) Prior Publication Data

US 2025/0007935 A1 Jan. 2, 2025

(51) Int. Cl.
*H04L 9/40* (2022.01)
*H04L 67/12* (2022.01)
*H04L 67/55* (2022.01)

(52) U.S. Cl.
CPC ...... *H04L 63/1425* (2013.01); *H04L 63/1416* (2013.01); *H04L 67/12* (2013.01); *H04L 67/55* (2022.05)

(58) Field of Classification Search
CPC . H04L 63/1425; H04L 63/1416; H04L 67/12; H04L 67/55; G06F 21/55
See application file for complete search history.

(56) References Cited

U.S. PATENT DOCUMENTS 8,903,593 B1 * 12/2014 Addepalli ............... G06F 9/542 701/30.6
10,489,141 B2 * 11/2019 Nakamura ......... G05B 19/0426
(Continued)

FOREIGN PATENT DOCUMENTS

JP S63305642 A 12/1988
JP 2017111796 A 6/2017
(Continued)

OTHER PUBLICATIONS

Herold et al. (2016) "Anomaly Detection for SOME/IP using Complex Event Processing" IEEE/IFIP NOMS 2016 Workshop: 2nd Workshop on Security for Emerging Distributed Network Technologies (DISSECT), pp. 1221-1226.
(Continued)

*Primary Examiner* — Javier O Guzman

(57) ABSTRACT

A monitoring device includes processing circuitry configured to use a normal communication model of communication between ECUs of a vehicle and determine, for each of packets transmitted and received by the ECUs, whether or not the packet is abnormal, when any one of the packets is determined to be abnormal, determine a series of packets from a same service and a same transmission source as the packet determined to be abnormal as abnormal on a basis of a Session ID indicating a communication order included in header information of the packet determined to be abnormal, and output information of a packet determined to be abnormal and information of a packet determined to be abnormal.

6 Claims, 13 Drawing Sheets

(56) References Cited

U.S. PATENT DOCUMENTS 10,992,688 B2 * 4/2021 Kishikawa .............. H04L 12/28
11,695,790 B2 * 7/2023 Kishikawa .............. H04L 67/12
726/23
11,838,303 B2 * 12/2023 Maeda ................ G06F 11/3013
12,411,675 B2 * 9/2025 Sakurai ................. G06F 3/0659
2015/0358351 A1 * 12/2015 Otsuka .................... H04L 12/66
726/23
2017/0118038 A1 * 4/2017 Ujiie .................... H04B 1/3822
2018/0203685 A1 * 7/2018 Nakamura .............. H04L 12/40
2018/0295147 A1 * 10/2018 Haga ....................... H04L 67/12
2018/0302422 A1 * 10/2018 Kishikawa ............ H04L 9/3271
2018/0316698 A1 * 11/2018 David ................. H04L 63/0236
2018/0351980 A1 * 12/2018 Galula ................ H04L 63/1425
2019/0349394 A1 * 11/2019 Kishikawa .......... H04L 63/1416
2020/0145433 A1 * 5/2020 Gutierrez ............. G06N 3/0985
2020/0220888 A1 * 7/2020 Terazawa .............. B60T 17/221
2020/0396238 A1 12/2020 Haga et al.
2021/0029148 A1 * 1/2021 Wee ...................... H04L 63/166
2021/0092025 A1 * 3/2021 Ukai ................. H04L 12/40143
2021/0281595 A1 9/2021 Hirano et al.
2022/0239528 A1 * 7/2022 Yamamoto .............. H04L 12/40
2022/0355750 A1 * 11/2022 Yamamoto .............. H04L 67/12
2023/0231864 A1 * 7/2023 Yasmin ............... H04L 63/1425
726/22

FOREIGN PATENT DOCUMENTS

WO 2019/117184 A1 6/2019
WO 2021/002013 A1 1/2021

OTHER PUBLICATIONS

Gehrmann et al. (2020) "Intrusion Detection for SOME/IP: Challenges and Opportunities" 2020 23rd Euromicro Conference on Digital System Design (DSD), pp. 583-587.

* cited by examiner

SYSTEM
VEHICLE
10
EXTERNAL DEVICE COMMUNICATION UNIT
12
ONBOARD COMPUTER
13
MONITORING DEVICE
100
OUTPUT PROCESSING UNIT
18
ABNORMALITY DETECTION RESULT
OCCASIONAL ANALYSIS UNIT
16
RETROACTIVE ANALYSIS UNIT
17
NORMAL COMMUNICATION MODEL
SWITCH
14
SWITCH
14
ECU
11
ECU
11
ECU
11
ECU
11
EXTERNAL NETWORK
EXTERNAL DEVICE
20
INTER-VEHICLE COMMUNICATION UNIT
21
ABNORMALITY DETECTION RESULT

Fig. 4

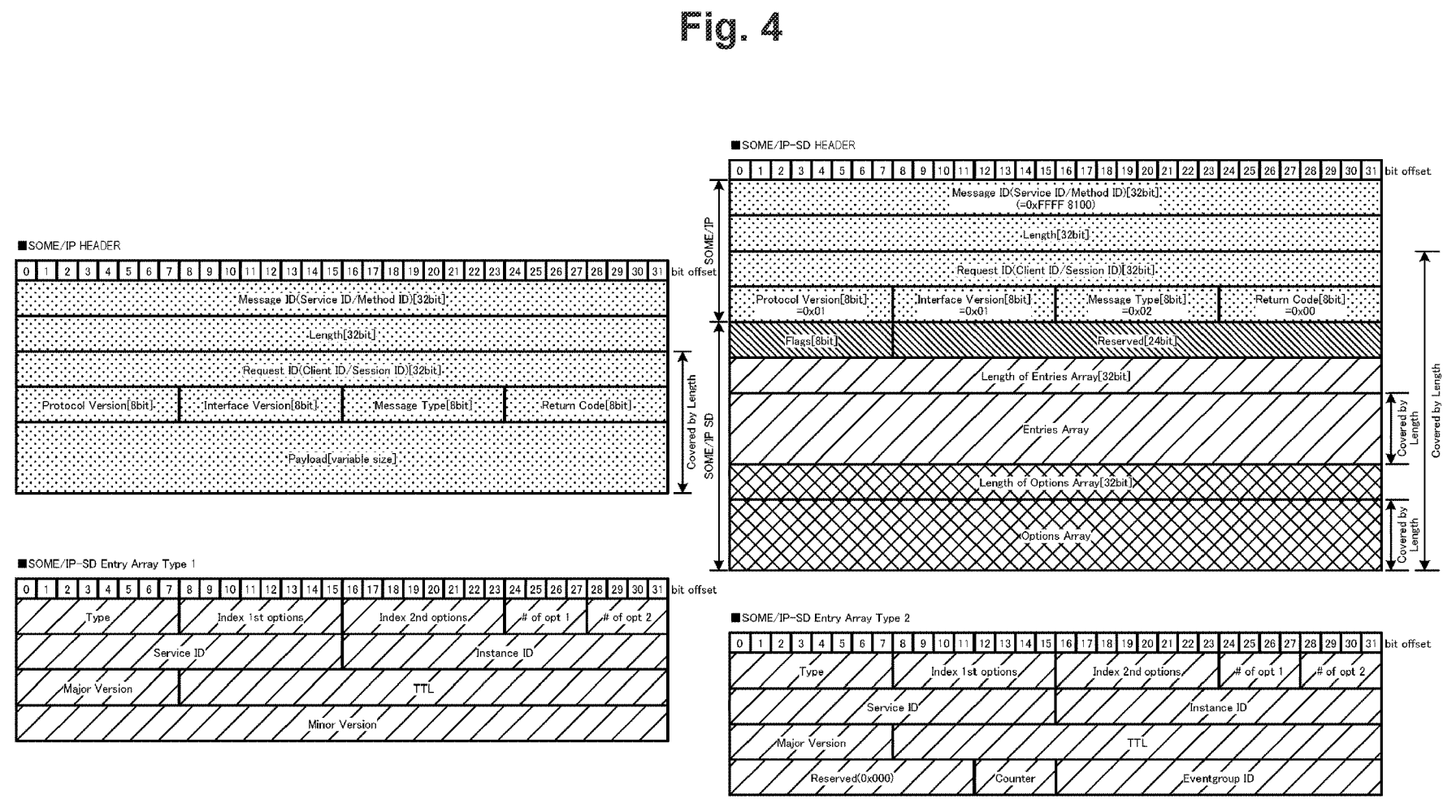

■SOME/IP HEADER bit offset 0–31

Message ID(Service ID/Method ID)[32bit]
Length[32bit]
Request ID(Client ID/Session ID)[32bit]
Protocol Version[8bit] | Interface Version[8bit] | Message Type[8bit] | Return Code[8bit]
Payload[variable size]

Covered by Length

■SOME/IP-SD HEADER bit offset 0–31

SOME/IP:
Message ID(Service ID/Method ID)[32bit] (=0xFFFF 8100)
Length[32bit]
Request ID(Client ID/Session ID)[32bit]
Protocol Version[8bit] =0x01 | Interface Version[8bit] =0x01 | Message Type[8bit] =0x02 | Return Code[8bit] =0x00

SOME/IP SD:
Flags[8bit] | Reserved[24bit]
Length of Entries Array[32bit]
Entries Array
Length of Options Array[32bit]
Options Array Covered by Length ■SOME/IP-SD Entry Array Type 1 bit offset 0–31

Type | Index 1st options | Index 2nd options | # of opt 1 | # of opt 2
Service ID | Instance ID
Major Version | TTL
Minor Version ■SOME/IP-SD Entry Array Type 2 bit offset 0–31

Type | Index 1st options | Index 2nd options | # of opt 1 | # of opt 2
Service ID | Instance ID
Major Version | TTL
Reserved(0x000) | Counter | Eventgroup ID SYSTEM
VEHICLE
10
EXTERNAL DEVICE COMMUNICATION UNIT
12
ONBOARD COMPUTER
13
EXTERNAL TRANSMISSION DATA COMPRESSION UNIT
19
SWITCH
14
ECU
11
EXTERNAL NETWORK
EXTERNAL DEVICE
20
INTER-VEHICLE COMMUNICATION UNIT
21
MONITORING DEVICE
100
ABNORMALITY DETECTION RESULT
OCCASIONAL ANALYSIS UNIT
16
RETROACTIVE ANALYSIS UNIT
17
NORMAL COMMUNICATION MODEL SYSTEM
VEHICLE
10
EXTERNAL DEVICE COMMUNICATION UNIT
12
ONBOARD COMPUTER
13
MONITORING DEVICE
100
OUTPUT PROCESSING UNIT
18
ABNORMALITY DETECTION RESULT
OCCASIONAL ANALYSIS UNIT
16
RETROACTIVE ANALYSIS UNIT
17
NORMAL COMMUNICATION MODEL
SWITCH
14
SWITCH
14
ECU
11
ECU
11
ECU
11
ECU
11
EXTERNAL NETWORK
EXTERNAL DEVICE
20
INTER-VEHICLE COMMUNICATION UNIT
21
ABNORMALITY DETECTION RESULT

Fig. 12

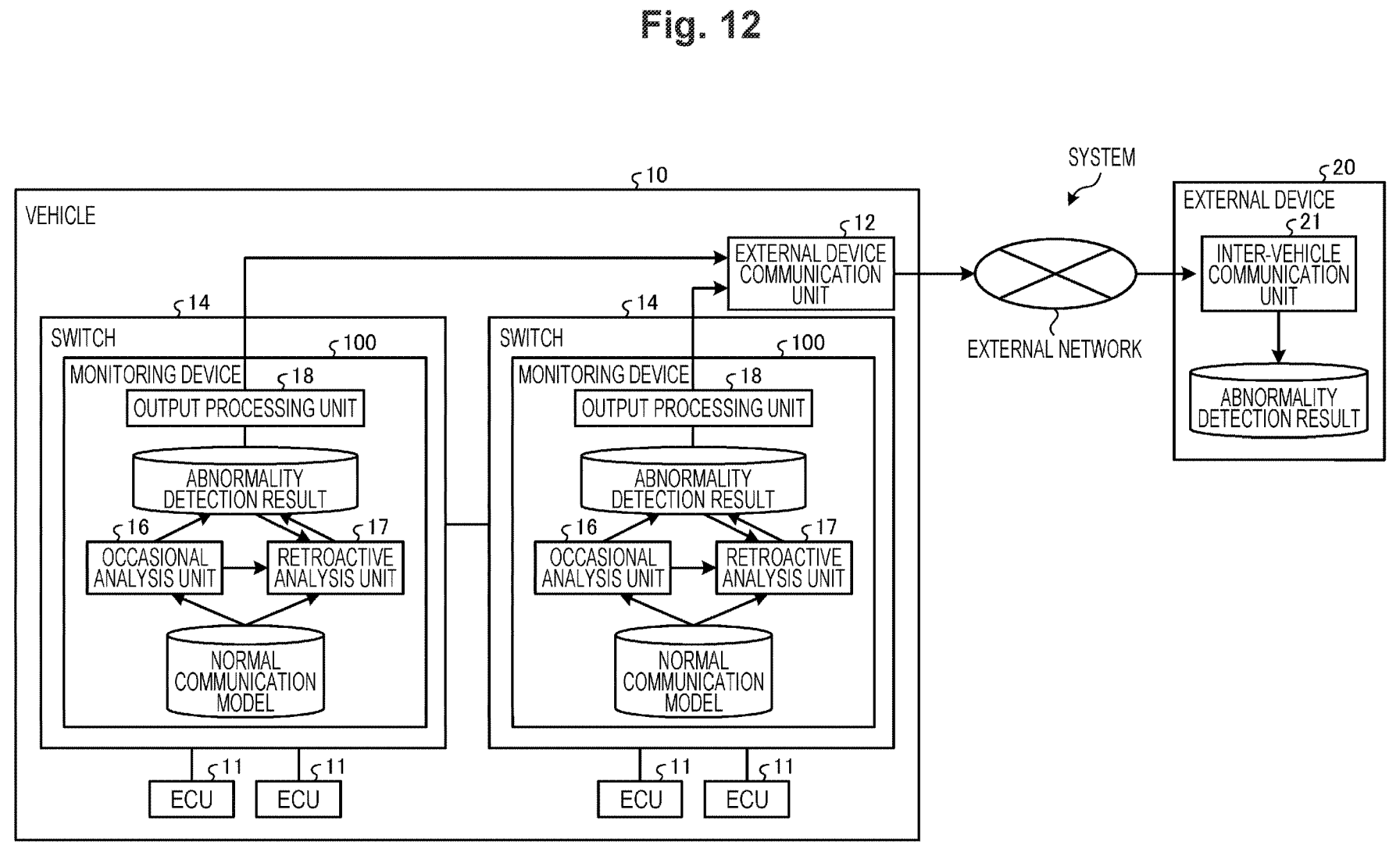

SYSTEM
EXTERNAL DEVICE 20
INTER-VEHICLE COMMUNICATION UNIT 21
ABNORMALITY DETECTION RESULT
EXTERNAL NETWORK
VEHICLE 10
EXTERNAL DEVICE COMMUNICATION UNIT 12
SWITCH 14
MONITORING DEVICE 100
OUTPUT PROCESSING UNIT 18
ABNORMALITY DETECTION RESULT
OCCASIONAL ANALYSIS UNIT 16
RETROACTIVE ANALYSIS UNIT 17
NORMAL COMMUNICATION MODEL
ECU 11
ECU 11
SWITCH 14
MONITORING DEVICE 100
OUTPUT PROCESSING UNIT 18
ABNORMALITY DETECTION RESULT
OCCASIONAL ANALYSIS UNIT 16
RETROACTIVE ANALYSIS UNIT 17
NORMAL COMMUNICATION MODEL
ECU 11
ECU 11

Fig. 13

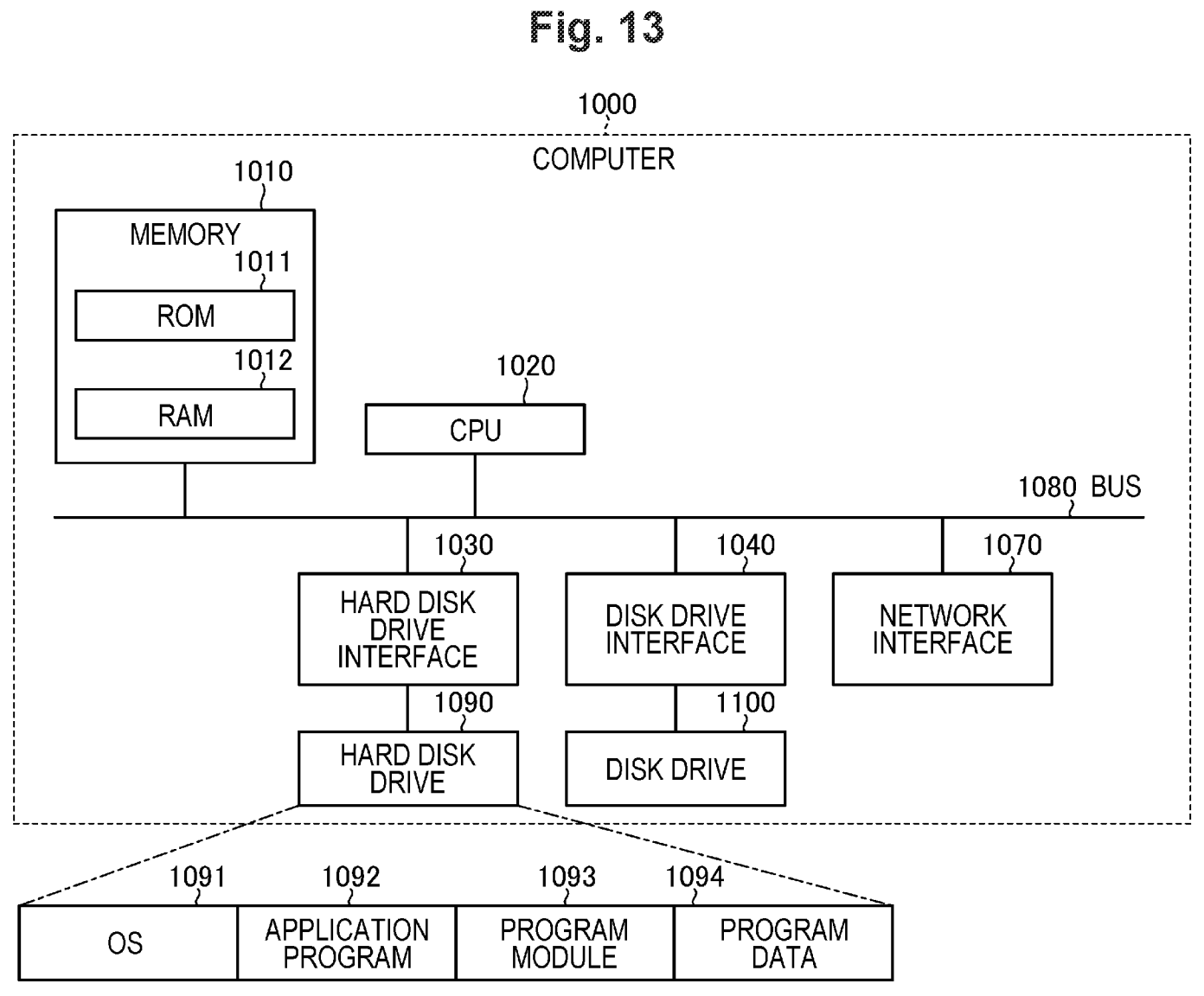

1000 COMPUTER

1010 MEMORY

1011 ROM

1012 RAM

1020 CPU

1030 HARD DISK DRIVE INTERFACE

1040 DISK DRIVE INTERFACE

1070 NETWORK INTERFACE

1080 BUS

1090 HARD DISK DRIVE

1100 DISK DRIVE

1091 OS

1092 APPLICATION PROGRAM

1093 PROGRAM MODULE

1094 PROGRAM DATA

MONITORING DEVICE, MONITORING METHOD, AND MONITORING PROGRAM

CROSS-REFERENCE TO RELATED APPLICATIONS

This application is a U.S. 371 Application of International Patent Application No. PCT/JP2021/043242, filed on 25 Nov. 2021, the disclosure of which is hereby incorporated herein by reference in its entirety.

TECHNICAL FIELD

The present invention relates to a monitoring device, a monitoring method, and a monitoring program.

BACKGROUND ART

Conventionally, a vehicle wirelessly communicates with a network outside the vehicle such as an outside server, and a risk of cyberattack is increased as in IT devices. As a research case related to a cyberattack on a vehicle, it has been pointed out that an attacker can intrude into an in-vehicle network by exploiting vulnerability related to wireless communication, transmit unauthorized communication by impersonating normal control communication, and illegally drive the vehicle to cause an accident.

Here, as a communication standard of an in-vehicle network, CAN, FlexRay, or the like has been used, but in-vehicle Ethernet (registered trademark) communication has been standardized due to a need for increasing a communication speed and a communication amount.

There is a plurality of in-vehicle Ethernet communication standards depending on applications, and there are Scalable service-Oriented MiddlewarE over IP (SOME/IP) and Scalable service-Oriented MiddlewarE over IP-Service Discovery (SOME/IP-SD) that substitute for communication related to overall vehicle control generally used in CAN and the like. An attack detection technology related to SOME/IP and SOME/IP-SD is mainly a method of detecting an attack based on a predetermined signature (see, for example, Non Patent Literatures 1 and 2).

CITATION LIST

Non Patent Literature

Non Patent Literature 1: Nadine Herold, Stephan-APosselt, Oliver Hanka, et al., "Anomaly Detection for SOME/IP using Complex Event Processing," IEEE/IFIP NOMS Workshop DISSECT 2016

Non Patent Literature 2: Tobias Gehrmann, Paul Duplys, "Intrusion Detection for SOME/IP:Challenges and Opportunities," IEEE EuromicroConference on Digital System Design (DSD) 2020

SUMMARY OF INVENTION

Technical Problem

However, in the detection based on the signature, there is a possibility that a new attack is overlooked. In addition, the existing technology uses packet information (for example, packet information of Layer 1 to Layer 4) of a lower layer than SOME/IP and SOME/IP-SD, such as an IP address and a MAC address. Here, the in-vehicle network is a static network in which information of a communication partner does not change frequently. In addition, when the attacker obtains a vehicle of the same vehicle type as the attack target vehicle and performs reverse engineering, the IP address/MAC address may be spoofed in control communication in the in-vehicle network, and an attack detector may overlook the attack.

In addition, when there is a repeater hub in the in-vehicle network, it seems that there is a plurality of terminals having the same IP address/MAC address depending on the installation location of the attack detector. Accordingly, the attack detector cannot accurately detect the attack.

Therefore, an object of the present invention is to solve the above-described problem and to accurately detect attacks in SOME/IP communication and SOME/IP-SD communication.

Solution to Problem

In order to solve the above problem, a monitoring device includes processing circuitry configured to use a normal communication model of communication between ECUs of a vehicle and determine, for each of packets transmitted and received by the ECUs, whether or not the packet is abnormal, when any one of the packets is determined to be abnormal, determine a series of packets from a same service and a same transmission source as the packet determined to be abnormal as abnormal on a basis of a Session ID indicating a communication order included in header information of the packet determined to be abnormal, and output information of a packet determined to be abnormal and information of a packet determined to be abnormal.

Advantageous Effects of Invention

According to the present invention, it is possible to accurately detect an attack in SOME/IP communication and SOME/IP-SD communication.

BRIEF DESCRIPTION OF DRAWINGS

FIG. 4 is a diagram illustrating header information of SOME/IP and SOME/IP-SD.

FIG. 12 is a diagram illustrating a configuration example of the system including the monitoring device.

FIG. 13 is a diagram illustrating a configuration example of a computer that executes a monitoring program.

DESCRIPTION OF EMBODIMENTS

Hereinafter, a mode for carrying out the present invention (embodiment) will be described with reference to the drawings. The present invention is not limited to the present embodiment.

First, an outline of a monitoring device of the present embodiment will be described with reference to FIG. 1. The monitoring device monitors control communication of the in-vehicle network. For example, the monitoring device monitors a communication packet transmitted and received between engine control units (ECUs) by an in-vehicle network in the vehicle. The communication packet between the ECUs is, for example, a packet of SOME/IP or SOME/IP-SD. Further, a case where the ECU performs Publish/Subscribe type communication will be described as an example.

For example, the monitoring device extracts a feature amount of a normal packet from a reception time of the normal packet and a header payload of the packet using a data set of normal communication between the ECUs in advance, and constructs a normal communication model of the communication between the ECUs. Then, the monitoring device detects communication of the ECU deviating from the normal communication model as an abnormality. Here, in a header of a packet of SOME/IP or SOME/IP-SD, a Session ID indicating a communication order exists. Therefore, the monitoring device detects an abnormality in communication (hereinafter, "communication" is appropriately abbreviated) of the ECU by using the communication order indicated by the Session ID of the packet.

The monitoring device detects a communication abnormality by combining two abnormality detection logics.

(1) Occasional determination logic: the monitoring device determines whether each packet is normal or abnormal.

(2) Retroactive determination logic: the monitoring device determines whether the entire specific packet group (packet group of same service and same transmission source) is normal or abnormal based on the Session ID of the packet.

Figure 1:
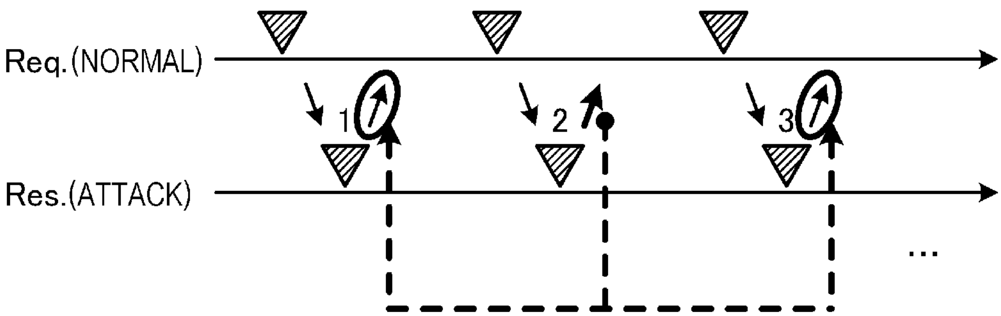
FIG. 1 is a diagram for describing retroactive determination executed by a monitoring device.

For example, a case is considered in which the monitoring device determines whether a series of packets of Request (Req.) and Response (Res.) illustrated in FIG. 1 is normal or abnormal. Here, Req. is a normal packet, and Res. is an attack packet.

Here, a case is considered in which the monitoring device determines that (overlooks) Res. with Session ID=1 is within the range of the normal communication model by (1) the occasional determination logic, but determines that Res. with Session ID=2 is out of the range of the normal communication model for a series of packets including Req. (normal) and Res. (attack).

In this case, the monitoring device determines that not only Res. with Session ID=2 but also Res. with Session ID=1 is abnormal by (2) the retroactive determination logic (retroactive determination). In addition, the monitoring device estimates that the response sequence of this Session is abnormal, and determines that Res. of Session ID=3 and thereafter is abnormal regardless of whether or not it is within the range of the normal communication model.

In this way, the monitoring device can determine that an abnormal packet that has been overlooked by (1) the occasional determination logic is abnormal by (2) the retroactive determination logic.

As a result, for example, in SOME/IP communication or SOME/IP-SD communication, even if header information of layers 1 to 4 of a packet is spoofed/tampered, the monitoring device can accurately detect an abnormality.

Note that the packet to be monitored by the monitoring device is, for example, a packet that is communicated in a static network in which information of a communication partner does not change frequently. In addition, the packet to be monitored (target of abnormality detection) by the monitoring device is not limited to the SOME/IP or SOME/IP-SD packet as long as the packet includes information indicating an order such as Session ID.

Note that the monitoring device is assumed to be installed, for example, at a position where all communication between target ECUs can be monitored. For example, the monitoring device is installed at a position through which all packets to be monitored pass on the vehicle network.

[Outline of occasional determination process] The monitoring device constructs the normal communication model by learning a normal communication pattern between ECUs for each service (details will be described later) using a data set of normal communication between ECUs in a vehicle to be monitored. Then, the monitoring device detects communication deviating from the normal communication model as an abnormality.

Here, the monitoring device constructs the normal communication model using, for example, the following feature amounts, and detects an abnormality in communication to be monitored using the following feature amounts.

(1) Service Structure

- Communication order of packet (for example, after the Req. packet, a Res. packet or the like is added)
- Sequence of session ID (counter) of packet
- The number of simultaneous subscriptions of the service when the packet is a Publish/Subscribe type communication packet (2) Packet Communication Interval $\Delta T$

- Overall session: average value of packet communication intervals
- Each communication: a value discretized based on a minimum value and a maximum value of a communication interval of each packet (3) Packet Payload Transition P, $\Delta P$

- Sensor value: whether difference $\Delta P$ (bitwise exclusive OR) is zero or other than zero
- Category value: difference $\Delta P$ and P
- Fixed value: whether or not it is a known value P Note that, as the feature amount of a sensor value, the difference $\Delta P$ itself may be used, or a value obtained by discretizing $\Delta P$ with a certain width may be used.

Figure 2:
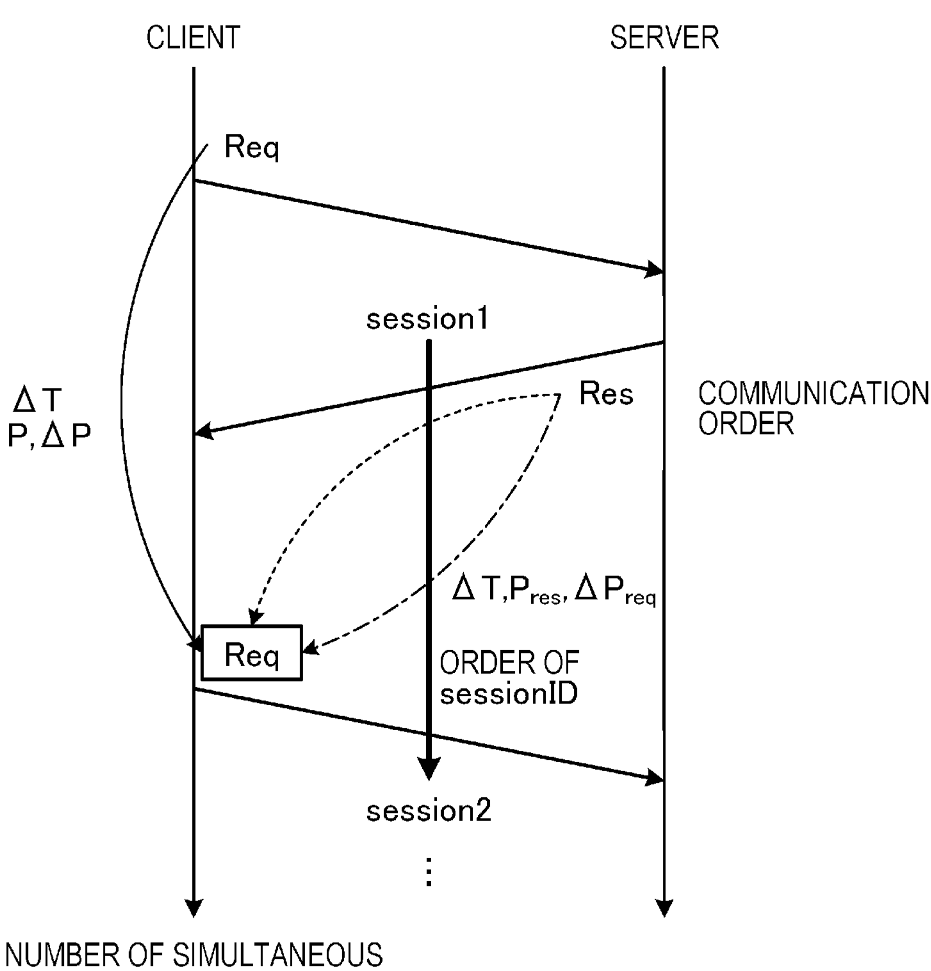
FIG. 2 is a diagram for describing a feature amount used when the monitoring device detects an abnormality.

For example, in a case where a Publish/Subscribe type communication is performed between ECUs of a vehicle, a feature amount when attention is paid to a second Req. packet in a communication series of a certain service is, for example, as illustrated in FIG. 2.

[Overview of Retroactive Determination Processing]

(1) Reevaluation of Abnormal Packet Overlooked in Occasional Determination Process As long as the specification of SOME/IP or SOME/IP-SD is followed, the monitoring device can collectively grasp a series of packets of the same transmission source by Session ID. That is, even if the IP address/MAC address is falsified, the monitoring device can identify the packet in which the IP address/MAC address is falsified based on the order of the Session IDs of the packets.

It is assumed that the attacker side also transmits the packet according to the SOME/IP or SOME/IP-SD specification. Therefore, when an abnormal packet is detected by the occasional determination logic, the monitoring device regards packets before and after the same transmission source as the abnormal packet as abnormal packets by the retroactive determination logic (see FIG. 1).

(2) Statistical Evaluation of Entire Series Based on Abnormality in Number of Sessions The monitoring device can model the number of subscribing ECUs (clients) of a certain service from the learning data. For example, when an attacker who performs impersonation appears, the number of subscribed ECUs increases. Therefore, when the number of subscribed ECUs deviates from the above model, the monitoring device can detect that any one of session (subscription Session) series is abnormal.

In a case where no abnormality is found in any of the plurality of session series by the timely determination, the monitoring device performs the retroactive determination at a predetermined retroactive determination timing (for example, at the end of any one of sessions). For example, the monitoring device obtains a statistic such as an average communication interval for each session, and when there is a session deviating from the normal communication model based on the statistic, the monitoring device performs retroactive determination of the entire session to detect an abnormality.

[Configuration example] Next, a configuration example of a system including the monitoring device 100 will be described with reference to FIG. 3. For example, the system includes a vehicle 10 and an external device 20. The vehicle 10 and the external device 20 are communicably connected by an external network such as the Internet. The external device 20 includes an inter-vehicle communication unit 21. The external device 20 receives and accumulates an abnormality detection result of the communication transmitted from the vehicle 10 by the inter-vehicle communication unit 21. The number of vehicles 10, the ECUs 11, and the external devices 20 is not limited to the number illustrated in FIG. 3.

The vehicle 10 includes a plurality of ECUs 11, an external device communication unit 12, and an onboard computer 13. The ECU 11 is a unit that controls each unit (for example, an engine, an indicator, and the like) constituting the vehicle 10. The ECU 11 performs control communication with another ECU 11 via the switch 14 to obtain information for operating its own ECU 11.

The external device communication unit 12 communicates with the external device 20 via the external network. For example, the external device communication unit 12 transmits data (for example, an abnormality detection result) output from the onboard computer 13 to the external device 20 via the external network.

The onboard computer 13 executes various processes related to the vehicle 10. For example, the onboard computer 13 includes a switch 14 and a monitoring device 100. The switch 14 relays and switches communication between the ECUs 11. The monitoring device 100 monitors communication between the ECUs 11 via the switch 14.

The monitoring device 100 includes, for example, the normal communication model, an occasional analysis unit (first determination unit) 16, a retroactive analysis unit (second determination unit) 17, and an output processing unit 18.

The normal communication model is a model for outputting, when receiving an input of communication to be monitored, whether or not the communication is normal. This normal communication model is constructed, for example, by the monitoring device 100 learning a normal communication pattern for each service using a data set of normal communication of the ECU 11 of the vehicle 10 to be monitored. The parameters of the normal communication model are stored in a predetermined area of a storage device included in the onboard computer 13.

The feature amount used for learning the normal communication model is, for example, (1) the structure of the service, (2) the communication interval LT of the packet, and (3) the payload transitions P and ΔP of the packet. Details of the feature amount will be described later.

The occasional analysis unit 16 determines whether or not there is an abnormality for each packet transmitted and received between the ECUs 11 using the normal communication model on the basis of the above-described occasional determination logic.

Further, the retroactive analysis unit 17 determines whether the entire series of packets of the same service and the same transmission source is normal or abnormal on the basis of the session ID of the packet on the basis of the retroactive determination logic by using a processing result by the occasional analysis unit 16. Details of processing by the occasional analysis unit 16 and the retroactive analysis unit 17 will be described later.

The output processing unit 18 outputs the processing result by the occasional analysis unit 16 and a processing result by the retroactive analysis unit 17. For example, the output processing unit 18 outputs the processing result (abnormality detection result) by the occasional analysis unit 16 and the processing result (abnormality detection result) by the retroactive analysis unit 17 to the external device communication unit 12.

[Feature Amount] Next, an example of feature amounts used by the monitoring device 100 to detect packet abnormality will be described with reference to FIG. 4. Note that, in the following description, a "server" refers to ECU 11 that serves as a server in a series of communication, and a "client" refers to ECU 11 that serves as a client in a series of communication.

Service

The monitoring device 100 identifies which service the packet belongs to by the Service ID of the header information of SOME/IP, the Method ID, the Service ID in the SOME/IP-SD Entry Array header, and the Instance ID. In addition, the monitoring device 100 identifies the transmission source of the packet of the service according to the Client ID of the header information of SOME/IP and the type of the transmission packet (for example, Request/Response). For example, since the client transmits Request but does not transmit Response, if the transmission packet is Request, the monitoring device 100 identifies the transmission source of the packet as the client (not the server).

In addition, in a case of a normal transmission source, Session ID (a header having a role of a counter) is counted up every time packet transmission is performed in association with Client ID. Accordingly, the monitoring device 100 can identify a transmission source of a series of packets of the same service by continuity of Session IDs of the packets.

On the basis of the data set of the normal communication, the monitoring device 100 learns how many types of services handled by SOME/IP or SOME/IP-SD communication of the ECU 11 of the vehicle 10 to be monitored and the value thereof. Then, the monitoring device 100 constructs a normal communication model for each service.

Communication Order of Packet (1) Case of SOME/IP

On the basis of the data set of the normal communication, the monitoring device 100 uses the response of the server to the Request by the client as the feature amount related to the communication order of the packet. Note that, in a case where the Request is transmitted a plurality of times in the data set, the monitoring device 100 also uses the next Request for the Response as the feature amount related to the communication order of the packet. Further, the monitoring device 100 also uses consecutive Event transmissions (nth and (n+1)th Event transmissions) by the server as the feature amount related to the communication order of the packet.

(2) Case of SOME/IP-SD

The monitoring device 100 uses Publish of the server for subscribe by the client as the feature amount regarding the communication order of the packet. For example, OfferService of the server with respect to FindService by the client is used as the feature amount related to the communication order of the packet. Note that the FindService may be continuously transmitted a plurality of times. In this case, the monitoring device 100 also uses the transmission order of the FindService as the feature amount.

For example, the monitoring device 100 uses the SubscribeEventgroup of the client for the OfferService by the server as the feature amount related to the communication order of the packet. In addition, there is a case where the OfferServices are continuously transmitted a plurality of times. In this case, the monitoring device 100 also uses the transmission order of the OfferService as the feature amount. Furthermore, the monitoring device 100 uses, for example, a SubscribeEventgroupAck (or SubscribeEventNack) of the server for the SubscribeEventgroup of the client as the feature amount related to the communication order of the packet.

Further, the monitoring device 100 uses, for example, a StopSubscribeEventgroup by the client after a series of communication of Unsubscribe by the client is performed as the feature amount regarding the communication order of the packet.

Session ID Order

Session-ID of SOME/IP and SOME/IP-SD is independently counted up for each communication type (for example, Request, Response, Event, FindService, OfferService, and the like). Thus, the monitoring device 100 uses the order of the Session IDs of the headers of SOME/IP and SOME/IP-SD as the feature amount. For example, if a client receives an Event packet with Session ID=0x0001, it is expected to receive an Event packet with Session ID=0x0002 next. Therefore, by using the above-described Session ID as the feature amount, for example, in a case where the Session ID of the Event packet received immediately before the Event packet of Session ID=n is not n−1, the monitoring device 100 can determine that the Event packet of Session ID=n is abnormal.

Supplement of payload transitions P and ΔP of packet

There is no payload in SOME/IP-SD, but there is a payload in SOME/IP. Therefore, for the SOME/IP packet, the monitoring device 100 models the payload P and its transition ΔP as follows.

For example, the monitoring device 100 divides a payload according to a degree of change of a sensor value, a category value, a fixed value, or the like included in the payload by using a communication specification of a service or any existing reverse engineering technology (for example, a technique of estimating a meaning in a payload, and the like).

Note that the sensor value is characterized in that the sensor value changes steadily and the value changes over the entire bit length value range. In addition, the category value is characterized in that the number of changes is relatively small and the number of types of values that can be taken with respect to the bit length is small. Further, the fixed value is characterized in that it is a bit that does not change in the data set of the normal communication.

Then, for each divided payload, the monitoring device 100 learns the following value as a transition pattern of the payload, for example, and constructs a normal communication model. For example, the monitoring device 100 learns a transition pattern of a payload using, as feature amounts, whether or not the difference ΔP (bitwise exclusive OR) is zero or other than zero for the sensor value, the difference ΔP and the value P for the category value, and whether the fixed value is a known value P, and constructs a normal communication model. Note that, as the feature amount of a sensor value, the difference ΔP itself may be used, or a value obtained by discretizing ΔP with a certain width may be used.

[Occasional determination process] Every time a packet of SOME/IP or SOME/IP-SD is received, the occasional analysis unit 16 of the monitoring device 100 determines, based on the normal communication model for each service, whether or not the packet is a pattern that can occur in the normal communication model of the service. Then, the occasional analysis unit 16 determines that the packet is normal if the packet is a pattern that can occur in the normal communication model of the service, and determines that the packet is abnormal if the packet is not a pattern that can occur in the normal communication model of the service.

Note that, in the present embodiment, the ECU 11 as an attacker is assumed to communicate with the normal ECU 11. That is, in the present embodiment, it is not assumed that the ECUs 11 as attackers communicate with each other. Therefore, for example, in a case where the occasional analysis unit 16 determines that packets of different transmission sources (ECUs 11) are abnormal in the same service and the same session, the transmission source (ECU 11) that is determined to be abnormal first is determined to be abnormal, and the other transmission source (ECU 11) is determined to be normal.

[Retroactive determination process] In addition, the retroactive analysis unit 17 of the monitoring device 100 performs (1) reevaluation of a packet missed in the occasional determination process and (2) statistical evaluation of the entire series on the basis of abnormality of the number of sessions. Since (1) is as described in the overview of the retroactive determination process, (2) will be described in detail with reference to specific examples.

For example, it is assumed that when the monitoring device 100 constructs a normal communication model of a certain service A (Request & Response), the number of simultaneous subscriptions=n (n clients, one server) is learned.

In this case, when the ECU 11 of the attacker impersonates a client and subscribes to a certain service, the number of simultaneous subscriptions becomes n+1, and the retroactive analysis unit 17 detects an abnormality in the simultaneous subscription number on the basis of the normal communication model. However, the monitoring device 100 suspends the determination of normality/abnormality in units of packets at this time point.

Here, in a case where the occasional analysis unit 16 detects an abnormality in the packet of any one of subscription sessions, the retroactive analysis unit 17 determines that all the packets of the transmission source (client) of the packet in which the abnormality is detected in the subscription session in which the abnormality is detected by the occasional analysis unit 16 are abnormal.

On the other hand, in a case where no abnormality is detected in any subscription session (remains normal) by the occasional analysis unit 16 until the session of all subscriptions is terminated, the retroactive analysis unit 17 specifies the subscription session most deviating from the normal communication model on the basis of the feature amount of the communication interval of the packet of each subscription session. Then, the retroactive analysis unit 17 regards the client of the subscription session deviating most from the normal communication model as abnormal, and determines that all the packets having the client as the transmission source are abnormal.

With such a monitoring device 100, in detection of communication abnormality in SOME/IP communication and SOME/IP-SD communication, even when communication abnormality is overlooked by timely determination, communication abnormality can be detected by retroactive determination. Therefore, the monitoring device 100 can accurately detect communication abnormality.

Figure 5:
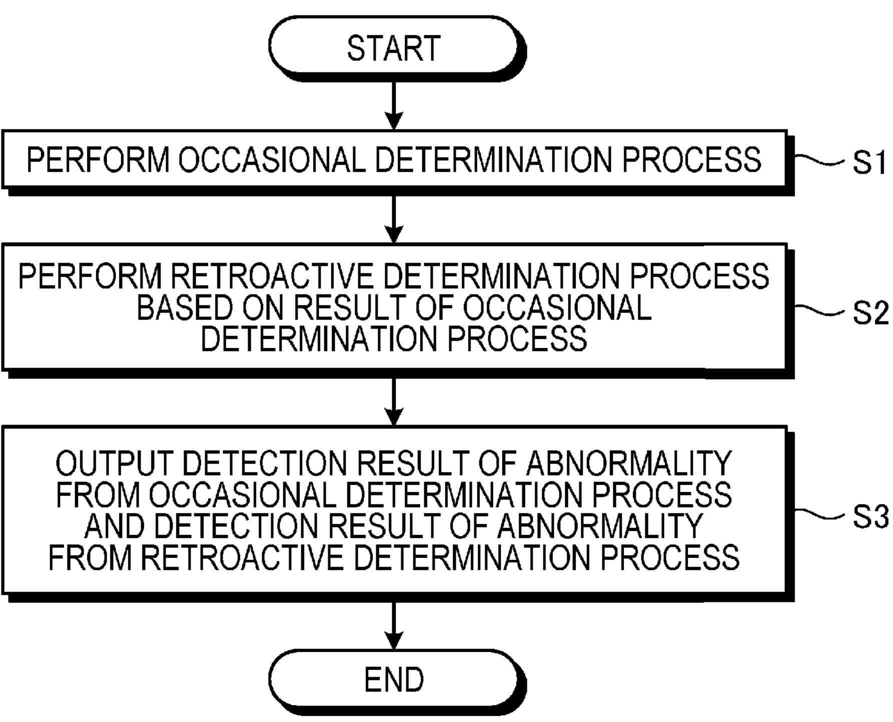
FIG. 5 is a flowchart illustrating an example of processing executed by the monitoring device.

[Example of processing procedure] Next, an example of a processing procedure of the monitoring device 100 will be described with reference to FIG. 5. The monitoring device 100 first performs the occasional determination process on each packet to be monitored (S1), and then performs the retroactive determination process based on the result of the occasional determination process on each packet in S1 (S2). Then, the monitoring device 100 outputs the detection result of the abnormality from the occasional determination process and the detection result of the abnormality from the retroactive determination process (S3).

As described above, the occasional analysis unit 16 and the retroactive analysis unit 17 of the monitoring device 100 perform (1) reevaluation of an abnormal packet missed in the occasional determination process and (2) statistical evaluation of the entire sequence based on abnormality of the number of sessions.

Figure 6:
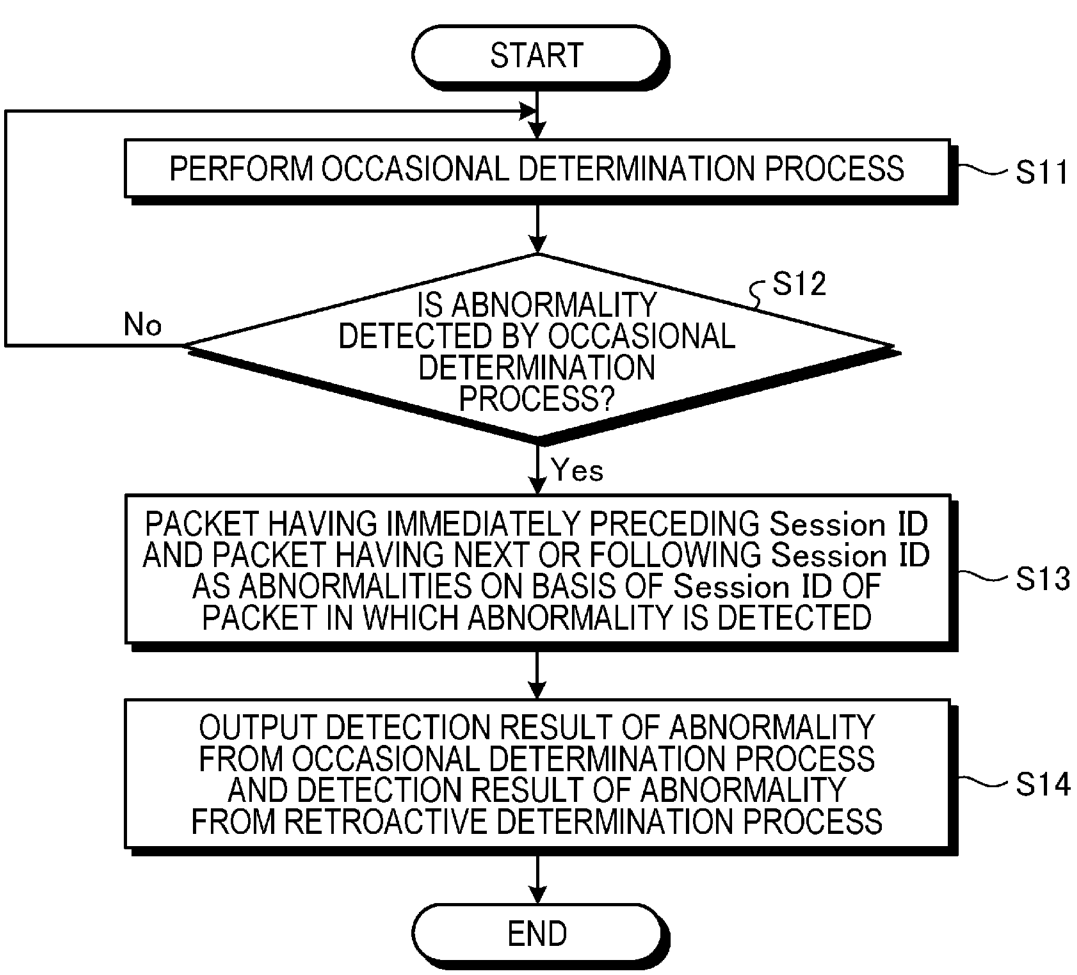
FIG. 6 is a flowchart illustrating an example of a procedure of a reevaluation process of an abnormal packet overlooked in an occasional determination process.

(1) Reevaluation of Abnormal Packet Overlooked in Occasional Determination Process For example, the monitoring device 100 reevaluates an abnormal packet that is overlooked in the occasional determination process according to the processing procedure illustrated in FIG. 6. First, the occasional analysis unit 16 of the monitoring device 100 performs the occasional determination process for each packet to be monitored (S11). Here, when the occasional analysis unit 16 does not detect the abnormality of the packet by the occasional determination process (No in S12), the occasional determination process in S11 is performed on the next packet (S11).

On the other hand, in a case where the abnormality of the packet is detected in the occasional determination process of S11 (Yes in S12), the retroactive analysis unit 17 detects a packet having an immediately preceding session ID and a packet having a next or following session ID as abnormalities on the basis of the session ID of the packet in which the abnormality is detected (S13). Then, the output processing unit 18 outputs the detection result of the abnormality from the occasional determination process and the detection result of the abnormality from the retroactive determination process (S14).

Figure 7:
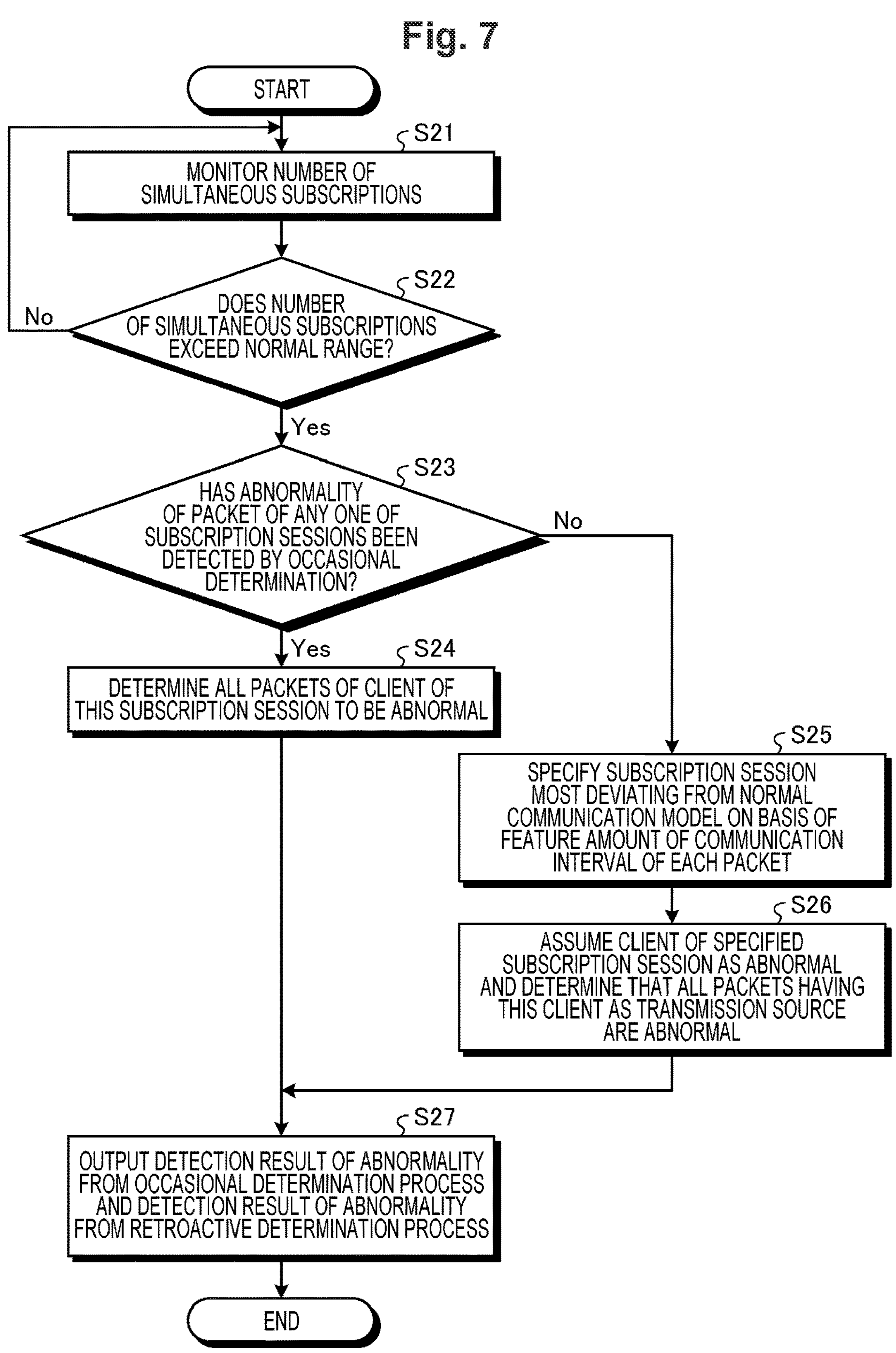
FIG. 7 is a flowchart illustrating an example of a procedure of a statistical evaluation of the entire sequence based on an abnormality of the number of sessions.

(2) Statistical Evaluation of Entire Series Based on Abnormality in Number of Sessions For example, the monitoring device 100 performs the statistical evaluation of the entire series based on the abnormality of the number of sessions (subscription sessions) in the Publish/Subscribe type communication by the processing procedure illustrated in FIG. 7. Note that, although detailed description is omitted here, it is assumed that the monitoring device 100 also performs the occasional determination process for each packet by the occasional analysis unit 16 in parallel with the following process.

First, the retroactive analysis unit 17 of the monitoring device 100 monitors the number of simultaneous subscription sessions (simultaneous subscription number) of communication to be monitored (S21), and determines whether or not the number of simultaneous subscriptions exceeds the normal range on the basis of the normal communication model (S22). Here, when the retroactive analysis unit 17 determines that the number of simultaneous subscriptions exceeds the normal range (Yes in S22), the process proceeds to S23. On the other hand, when the retroactive analysis unit 17 determines that the number of simultaneous subscriptions to be monitored is within the normal range (No in S22), the process returns to S21.

In S23, when the retroactive analysis unit 17 determines that the abnormality of the packet of any one of the subscription sessions has been detected by the occasional determination by the occasional analysis unit 16 (Yes in S23), all the packets of the client of the subscription session are determined to be abnormal (S24).

On the other hand, in S23, when the retroactive analysis unit 17 determines that the abnormality of the packet has not been detected in any of the subscription sessions by the occasional determination by the occasional analysis unit 16 (No in S23), the subscriber session most deviating from the normal communication model is specified on the basis of the feature amount of the communication interval of each packet of each subscription session (S25). Then, the retroactive analysis unit 17 determines that all the packets having the client of the subscription session specified in S25 as the transmission source are abnormal (S26).

Then, the output processing unit 18 outputs a detection result of an abnormality made by the occasional analysis unit 16 and a detection result of an abnormality made by the retroactive analysis unit 17 (S27).

Monitoring device 100 can accurately detect a new attack or an attack caused by spoofing of an IP address/MAC address by performing the above process.

[Other embodiments] Note that, although the case where the communication to be monitored by the monitoring device 100 is the Publish/Subscribe type communication has been described as an example, the present invention is not limited thereto as long as the communication is communication in which a Session ID is assigned to a communication packet. In this case, the monitoring device 100 performs (1) reevaluation of the abnormal packet overlooked in the occasional determination process and (2) reevaluation of the abnormal packet overlooked in the occasional determination process among (1) statistical evaluation of the entire sequence based on the abnormality of the number of sessions.

In addition, the monitoring device 100 may further include a learning unit that learns a normal communication model on the basis of normal communication between the ECUs 11.

Figure 3:
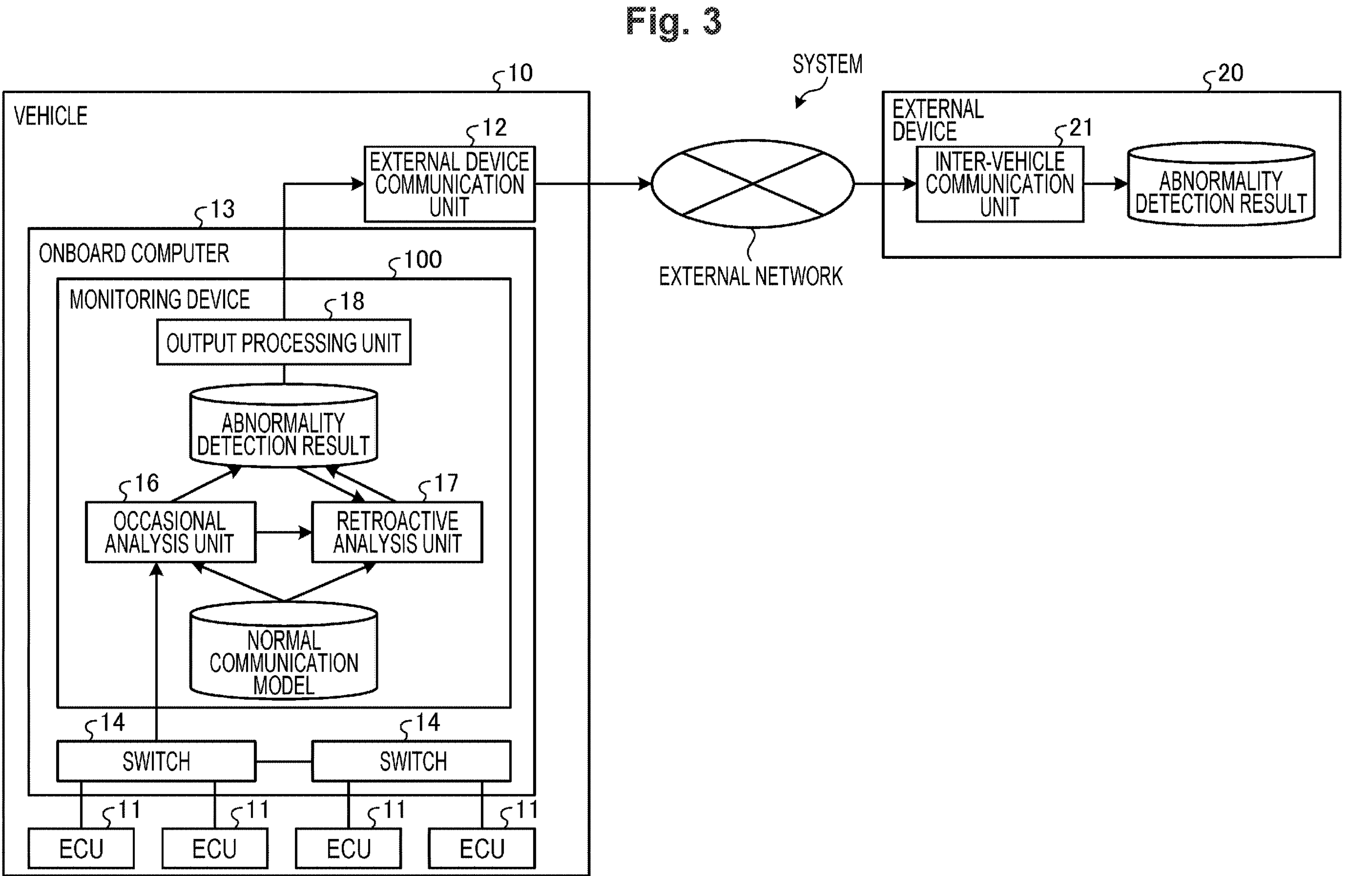
FIG. 3 is a diagram illustrating a configuration example of a system including the monitoring device.
Figure 8:
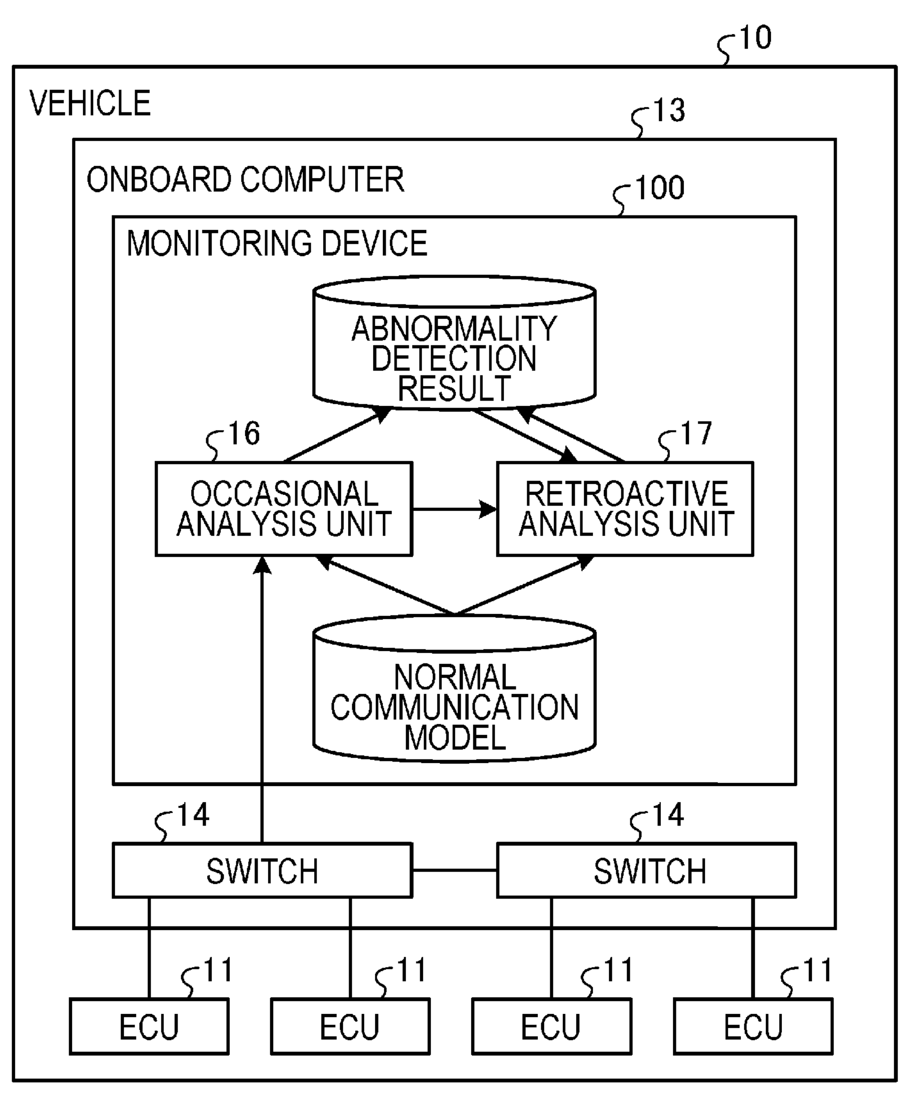
FIG. 8 is a diagram illustrating a configuration example of the system including the monitoring device.

Further, the system configuration including the monitoring device 100 is not limited to the system configuration illustrated in FIG. 3. For example, as illustrated in FIG. 8, a result of abnormality detection (abnormality detection result) by the monitoring device 100 may be accumulated in the onboard computer 13.

Figure 9:
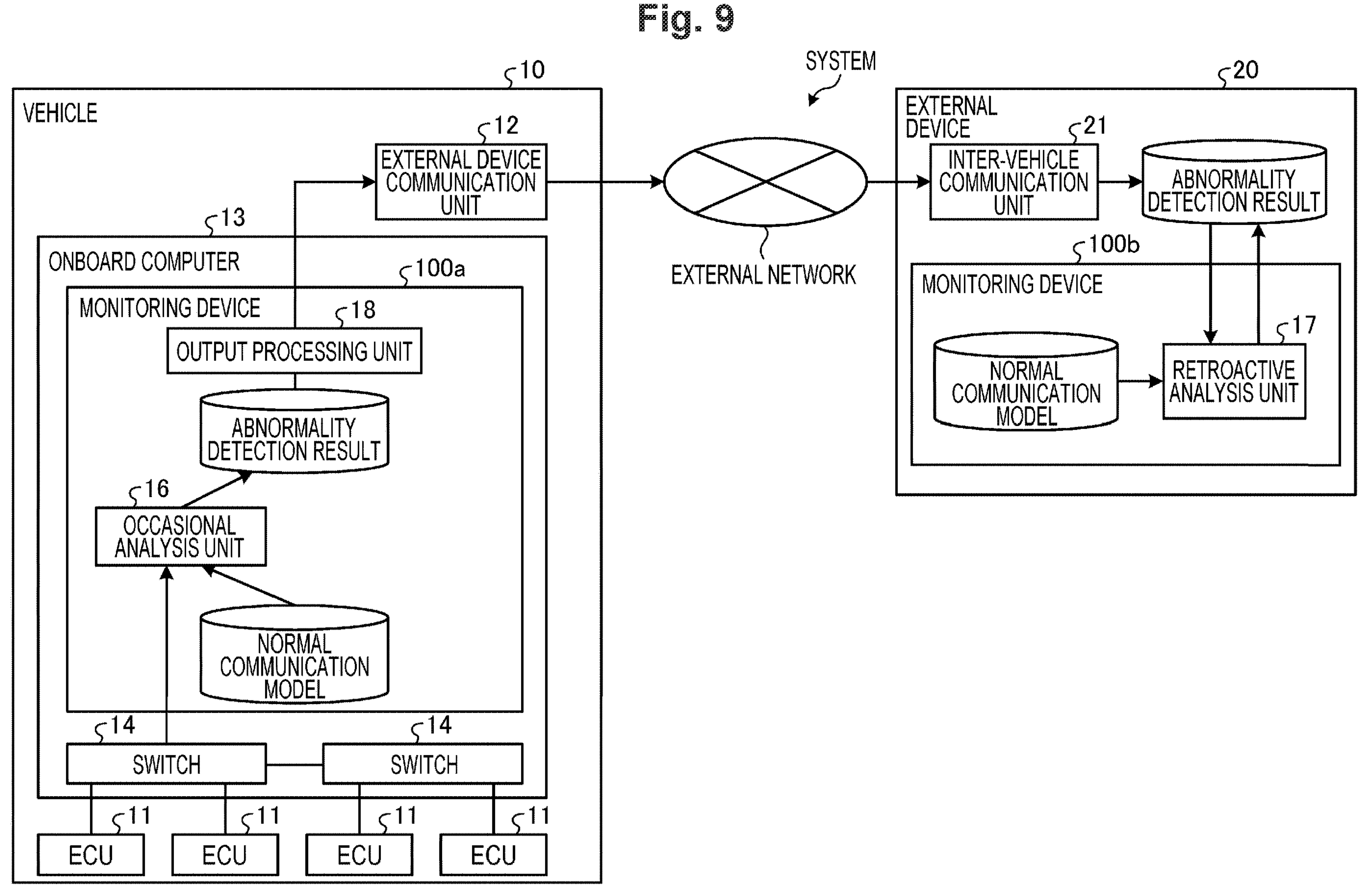
FIG. 9 is a diagram illustrating a configuration example of the system including the monitoring device.

In addition, as illustrated in FIG. 9, the occasional analysis unit 16 may be provided in the monitoring device 100*a* in the onboard computer 13, and the retroactive analysis unit 17 may be provided in the monitoring device 100*b* in the external device 20. In this case, the monitoring device 100*a* transmits a result (abnormality detection result) of the determination made by the occasional analysis unit 16 to the external device 20. Then, the monitoring device 100*b* of the external device 20 performs the retroactive determination using the result of the timely determination by the retroactive analysis unit 17. Then, the retroactive analysis unit 17 accumulates the results of the retroactive determination (abnormality detection results).

Figure 10:
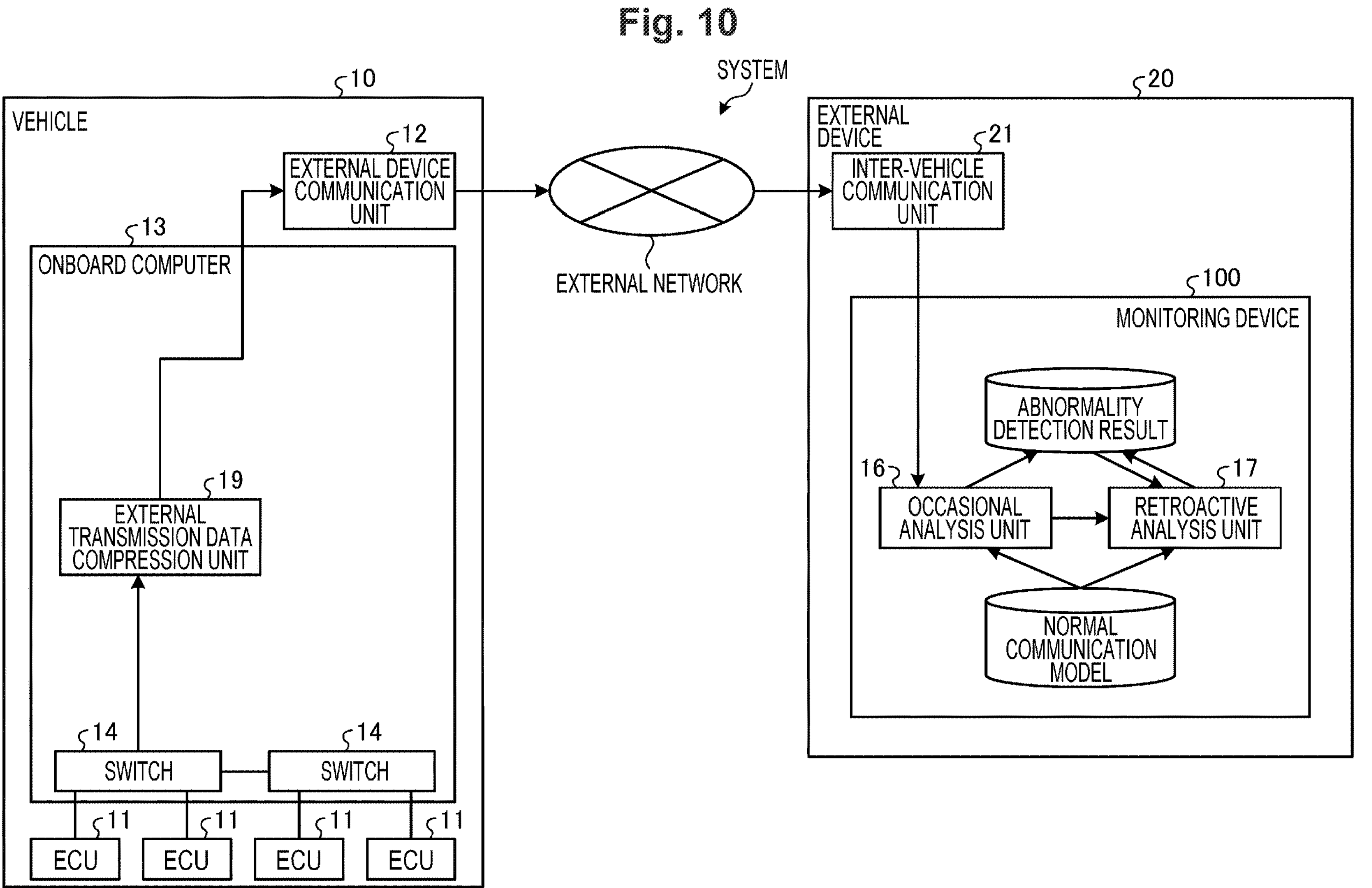
FIG. 10 is a diagram illustrating a configuration example of the system including the monitoring device.

In addition, as illustrated in FIG. 10, the monitoring device 100 of the external device 20 may acquire a communication packet between the ECUs 11 from the onboard computer 13 and detect an abnormality in the acquired communication packet. In this case, for example, the onboard computer 13 includes an external transmission data compression unit 19 that compresses and transmits communication of SOME/IP or SOME/IP-SD. Then, the onboard computer 13 compresses the communication of SOME/IP or SOME/IP-SD by the external transmission data compression unit 19 and transmits the compressed communication to the external device 20.

Figure 11:
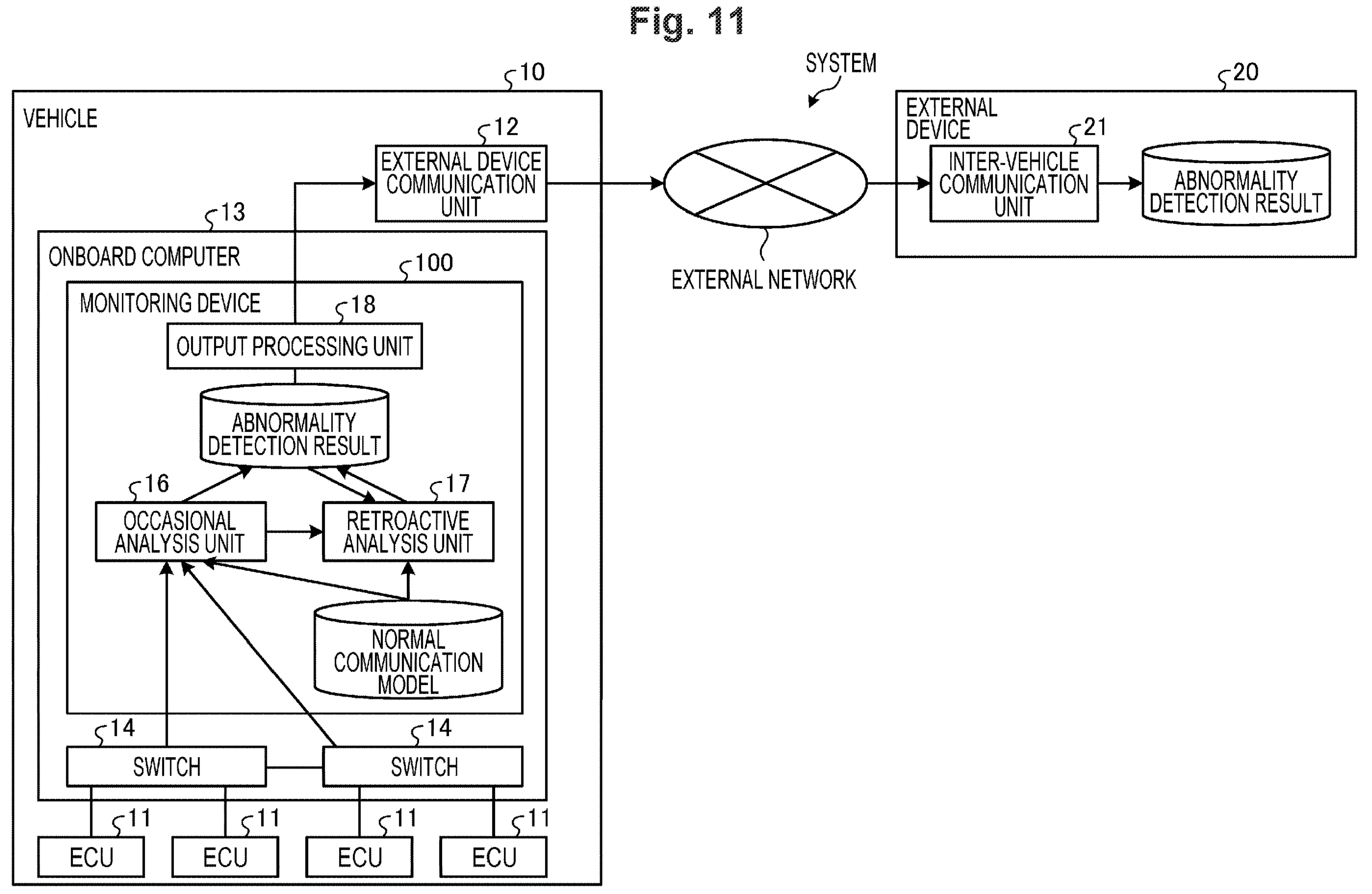
FIG. 11 is a diagram illustrating a configuration example of the system including the monitoring device.

In addition, the monitoring device 100 may monitor communication for each device (for example, a switch, a hub, or the like) that bundles subnets of in-vehicle Ethernet and detect an abnormality. For example, as illustrated in FIG. 11, the monitoring device 100 may detect an abnormality by acquiring SOME/IP or SOME/IP-SD communication from each of the switches 14 accommodating the ECU 11.

In addition, the monitoring device 100 may be mounted on a switch or a hub in the vehicle. For example, as illustrated in FIG. 12, each of the switches 14 in the vehicle 10 may be equipped with a monitoring device 100, and the monitoring device 100 in the switch 14 may acquire communication of SOME/IP or SOME/IP-SD in the subnet bundled by the switch 14 and detect an abnormality.

[System configuration and the Like] Moreover, each component of each unit illustrated is functionally conceptual, and does not necessarily need to be physically configured as illustrated. That is, specific forms of distribution and integration of devices are not limited to the illustrated forms, and some or all of the devices can be functionally or physically distributed and integrated in any units according to various loads, usage conditions, and the like. Further, some or all of the processing functions performed in the devices can be implemented by a CPU and a program to be executed by the CPU or can be implemented as hardware by wired logic.

In the processes described in the above-described embodiments, some or all of the processes described as being automatically performed may be manually performed, or some or all of the processes described as being manually performed may be automatically performed by a known method. In addition, the processing procedures, the control procedures, the specific names, and the information including various kinds of data and parameters that are illustrated in the above literatures and drawings can be changed as appropriate, unless otherwise mentioned.

[Program] The above-described monitoring device 100 can be implemented by installing a program (monitoring program) as package software or online software in a desired computer (for example, the onboard computer 13). For example, an information processing device is caused to execute the above program, thereby functioning as the monitoring device 100. Here, the information processing device also includes mobile communication terminals such as a smartphone, a mobile phone, and a personal handyphone system (PHS) and terminals such as a personal digital assistant (PDA).

FIG. 13 illustrates an example of the computer that executes a monitoring program. A computer 1000 includes a memory 1010 and a CPU 1020, for example. Further, the computer 1000 also includes a hard disk drive interface 1030, a disk drive interface 1040, and a network interface 1070. In addition, the computer 1000 includes a switch 14 (not illustrated in FIG. 13). These units are connected to each other via a bus 1080.

The memory 1010 includes a read only memory (ROM) 1011 and a random access memory (RAM) 1012. The ROM 1011 stores, for example, a boot program such as a basic input output system (BIOS). The hard disk drive interface 1030 is connected to a hard disk drive 1090. The disk drive interface 1040 is connected to a disk drive 1100. For example, a removable storage medium such as a magnetic disk or an optical disc is inserted into the disk drive 1100.

The hard disk drive 1090 stores, for example, an OS 1091, an application program 1092, a program module 1093, and program data 1094. That is, the program that defines each process executed by the monitoring device 100 is implemented as a program module 1093 in which a code executable by a computer is described. The program module 1093 is stored in, for example, the hard disk drive 1090. For example, a program module 1093 for executing processing similar to the functional configuration in the monitoring device 100 is stored in the hard disk drive 1090. Note that the hard disk drive 1090 may be replaced with a solid state drive (SSD).

Data to be used in the processes of the above embodiments is stored as the program data 1094 in, for example, the memory 1010 or the hard disk drive 1090. The CPU 1020 then reads the program module 1093 and the program data 1094 stored in the memory 1010 or the hard disk drive 1090 into the RAM 1012 as necessary and executes the program module 1093 and the program data 1094.

Note that the program module 1093 and the program data 1094 are not limited to being stored in the hard disk drive 1090, and may be stored in, for example, a removable storage medium and read by the CPU 1020 via the disk drive 1100 or the like. Alternatively, the program module 1093 and the program data 1094 may be stored in another computer connected via a network (local area network (LAN), wide area network (WAN), or the like). The program module 1093 and the program data 1094 may be read by the CPU 1020 from another computer via the network interface 1070.

REFERENCE SIGNS LIST

10 Vehicle
11 ECU
12 External device communication unit
13 Onboard computer
14 Switch
16 Occasional analysis unit
17 Retroactive analysis unit
18 Output processing unit

19 External transmission data compression unit
20 External device
21 Inter-vehicle communication unit
100, **100*a*, 100*b*** Monitoring device

The invention claimed is:

1. A monitoring device comprising:

processing circuitry configured to:

use a normal communication model of communication between Engine Control Unit (ECUs) of a vehicle and determine, for each of packets transmitted and received by the ECUs, whether or not the packet is abnormal;

when any one of the packets is determined to be abnormal, determine a series of packets with consecutive Session IDs following the preceding packet determined to be abnormal as abnormal on a basis of a Session ID indicating a communication order included in header information of the packet determined to be abnormal;

when none of the packets is determined to be abnormal in subscription Sessions, a subscriber Session that is most deviating from a normal communication model is determined to be abnormal based on a feature amount of communication interval, wherein the feature amount is determined based on communication order of the packet, packet communication interval, and packet payload transition; and output information of a packet determined to be abnormal and information of a packet determined to be abnormal.

2. The monitoring device according to claim 1, wherein the communication between the ECUs is a Publish/Subscribe type communication, and in a case where it is determined that a number of simultaneous subscription clients in the Publish/Subscribe type communication exceeds a normal range, when determining that a packet of any one of the subscription Sessions is abnormal, the processing circuitry is further configured to determine that a packet of a subscription client in the subscription Session determined to be abnormal.

3. The monitoring device according to claim 2, wherein in a case where it is determined that the number of simultaneous subscription clients in the Publish/Subscribe type communication exceeds the normal range, when determining that no packet of any one of the subscription Sessions is abnormal until all the subscription Sessions are terminated, the processing circuitry is further configured to specify a subscription Session in which a feature amount of a communication interval of each of the packets is most deviated from a normal communication model, and determine that a packet of a subscription client in the specified subscription Session is determined to be abnormal.

4. The monitoring device according to claim 1, wherein the packet is a packet of SOME/IP protocol or SOME/IP-SD protocol.

5. A monitoring method executed by a monitoring device, the monitoring method comprising:

using a normal communication model of communication between Engine Control Unit (ECUs) of a vehicle and determining, for each of packets transmitted and received by the ECUs, whether or not the packet is abnormal;

when any one of the packets is determined to be abnormal, determining a series of packets with consecutive Session IDs following the preceding packet determined to be abnormal as abnormal on a basis of a Session ID indicating a communication order included in header information of the packet determined to be abnormal;

when none of the packets is determined to be abnormal in subscription Sessions, a subscriber Session that is most deviating from a normal communication model is determined to be abnormal based on a feature amount of communication interval, wherein the feature amount is determined based on communication order of the packet, packet communication interval, and packet payload transition; and outputting information of a packet determined to be abnormal and information of a packet determined to be abnormal.

6. A non-transitory computer-readable recording medium storing therein a monitoring program that causes a computer to execute a process comprising:

using a normal communication model of communication between Engine Control Unit (ECUs) of a vehicle and determining, for each of packets transmitted and received by the ECUs, whether or not the packet is abnormal;

when any one of the packets is determined to be abnormal, determining a series of packets with consecutive Session IDs following the preceding packet determined to be abnormal as abnormal on a basis of a Session ID indicating a communication order included in header information of the packet determined to be abnormal;

when none of the packets is determined to be abnormal in subscription Sessions, a subscriber Session that is most deviating from a normal communication model is determined to be abnormal based on a feature amount of communication interval, wherein the feature amount is determined based on communication order of the packet, packet communication interval, and packet payload transition; and outputting information of a packet determined to be abnormal and information of a packet determined to be abnormal.

* * * * *